(12) United States Patent
Ueda

(10) Patent No.: US 6,929,240 B2
(45) Date of Patent: Aug. 16, 2005

(54) SOLENOID VALVE

(75) Inventor: Masatoshi Ueda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/777,175

(22) Filed: Feb. 13, 2004

(65) Prior Publication Data
US 2004/0159811 A1 Aug. 19, 2004

(30) Foreign Application Priority Data

Feb. 14, 2003 (JP) ........................................ 2003-037124

(51) Int. Cl.$^7$ ............................................. R16K 31/02
(52) U.S. Cl. ........................... 251/129.02; 251/129.07; 251/129.15; 251/129.17; 251/321; 251/358; 251/359
(58) Field of Search ........................ 251/129.01–129.22, 251/318–324, 356–363, 157–204, 314–317.01; 137/493–493.9

(56) References Cited

U.S. PATENT DOCUMENTS

| | | | | |
|---|---|---|---|---|
| 4,317,467 A | * | 3/1982 | Heyland ..................... 137/493 |
| 4,471,804 A | * | 9/1984 | Bauer ....................... 137/493.8 |
| 5,152,500 A | * | 10/1992 | Hoobyar et al. ............ 251/269 |
| 5,172,887 A | * | 12/1992 | Cross et al. ........... 251/129.19 |
| 5,277,400 A | * | 1/1994 | Bierther ................. 251/129.18 |
| 5,649,687 A | * | 7/1997 | Rosas et al. ........... 251/129.15 |

FOREIGN PATENT DOCUMENTS

| | | |
|---|---|---|
| JP | 2000-046277 A | 2/2000 |
| JP | 2000-179747 A | 6/2000 |
| JP | 2001-227671 A | 8/2001 |
| JP | 2001-254865 A | 9/2001 |

* cited by examiner

Primary Examiner—Justine R. Yu
Assistant Examiner—Peter deVore
(74) Attorney, Agent, or Firm—Sughrue Mion, PLLC

(57) ABSTRACT

A valve 6 fixed on a tip 5a of a rod 5 as a moving part, abuts a sealing part 9 of a fluid passage 8 when the rod 5 moved to the left, and interrupts a flow of fluid, is made, for instance, of elastic materials such as rubber. This absorbs an impact generated when the valve is sealed (at the time of collision), and reduces loudness of an actuating sound caused by a collision between the valve 6 and the sealing part 9.

23 Claims, 4 Drawing Sheets

SOLENOID VALVE

BACKGROUND OF THE INVENTION

1. Field of the Invention

The present invention relates to a solenoid valve in which a moving part moves by electromagnetic force to close a valve.

2. Description of the Related Art

Conventionally, a solenoid valve is arranged such that, when it is energized and electromagnetic force is generated, a moving part having on its tip a valve that moves by the electromagnetic force, and a stroke of the moving part causes the valve to abut a sealing part of a fluid passage, which interrupts a flow of fluid.

The conventional solenoid valve, however, produces an actuating sound (impact sound) caused by a collision between the valve and the sealing part in abutting the valve against the sealing part of the fluid passage. For instance, when the solenoid valve is installed in a vehicle, depending on where the valve is installed, an actuating sound can be transmitted inside a vehicle as a noise.

JP 2001-227671 A (paragraph numbers 0014 to 0036, FIG. 1) discloses a solenoid valve in which an air orifice is formed in a diaphragm to decrease a moving speed of a moving part via the air orifice, thereby reducing loudness of an actuating sound. Nonetheless, a mere decrease in the moving speed of the moving part bumps immediately against bounds to reduction in the actuating sound, and depending on where the valve is installed, an actuating sound can be transmitted inside the vehicle as a noise.

The conventional solenoid valve thus arranged as above involves a problem that when the valve abuts the sealing part of the fluid passage, an actuating sound is produced by a collision between the valve and the sealing part, and depending on where the valve is installed, the actuating sound can be transmitted inside a vehicle as a noise

SUMMARY OF THE INVENTION

The present invention has been made to solve the above-mentioned problem. An object of the present invention is to provide a solenoid valve which is able to reduce an actuating sound caused by a collision between the valve and the sealing part. The solenoid valve of the present invention is made of elastic materials showing a tendency to yield when the valve abutted the sealing part of the fluid passage.

According to the present invention in which the valve is made of elastic materials developing a tendency to yield when the valve abutted the sealing part of the fluid passage, an impact had when the valve is sealed is absorbed, thereby reducing loudness of the actuating sound caused by a collision between the valve and the sealing part.

DETAILED DESCRIPTION OF THE PREFERRED EMBODIMENTS

Preferred embodiments of the present invention will now be described below with reference to the attached drawings.

First Embodiment

Figure 1:
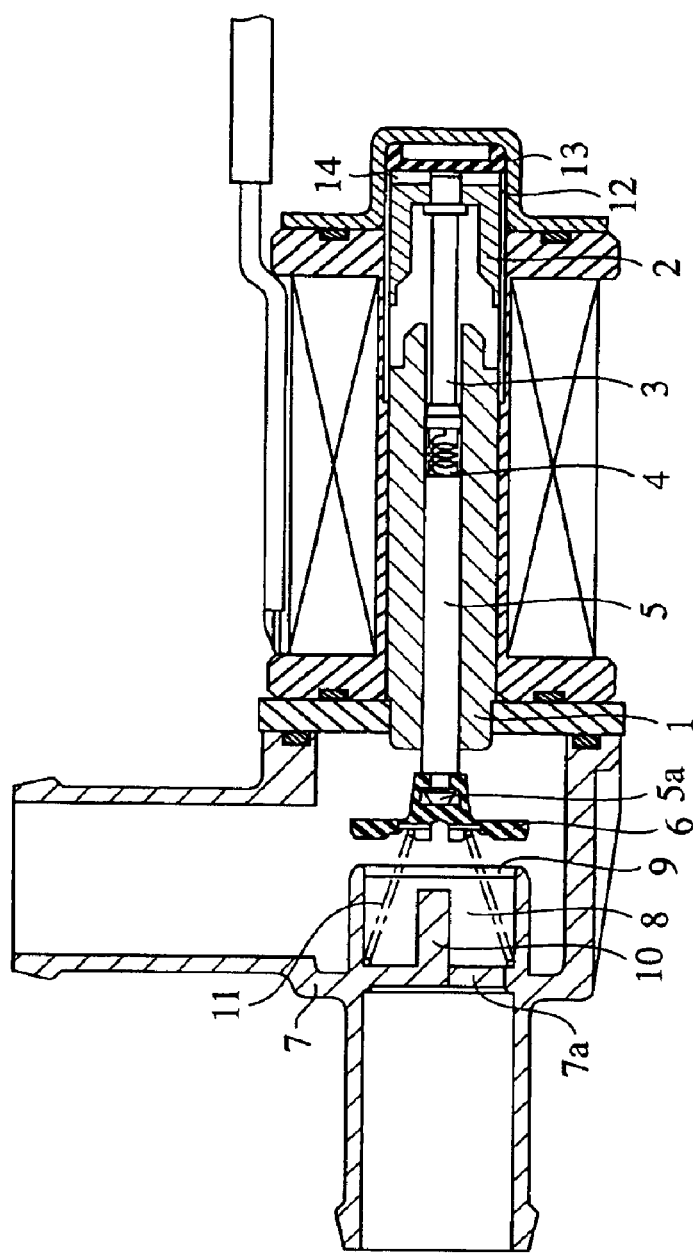
FIG. 1 is a structural drawing showing a solenoid valve according to a first embodiment of the present invention.
Figure 1:
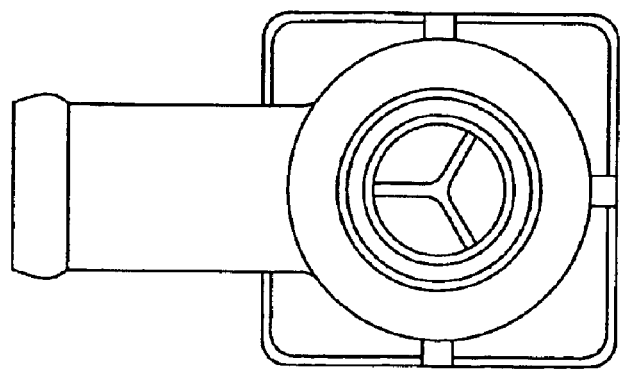
Figure 2:
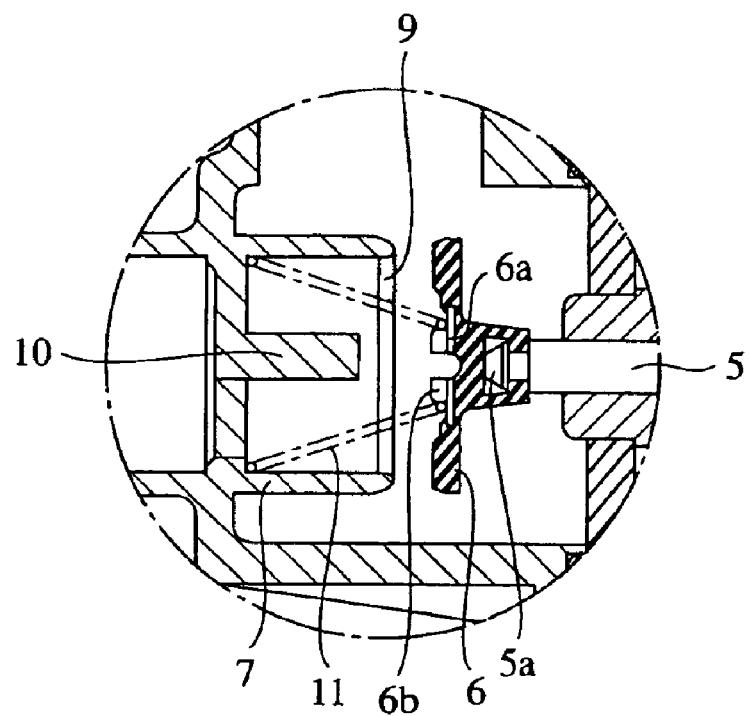
FIG. 2 is a structural drawing showing a purview of the solenoid valve shown in FIG. 1.
Figure 3:
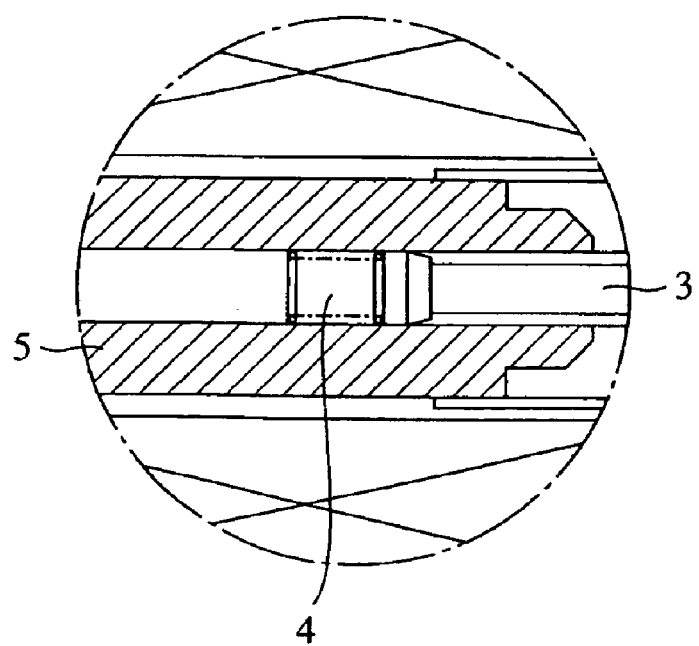
FIG. 3 is a structural drawing showing a purview of the solenoid valve shown in FIG. 1.
Figure 4:
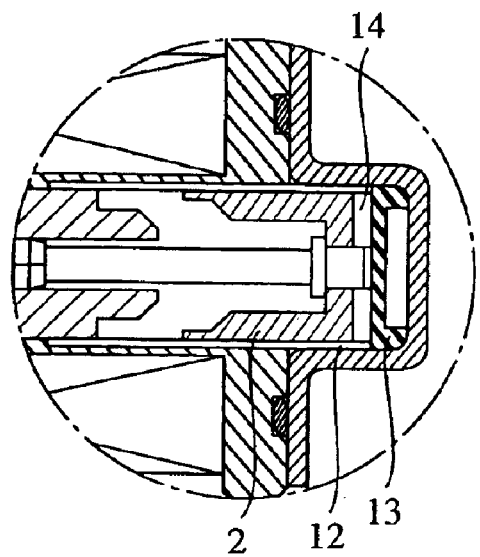
FIG. 4 is a structural drawing showing a purview of the solenoid valve shown in FIG. 1.

FIG. 1 is a structural drawing showing a solenoid valve according to a first embodiment of the present invention, and FIGS. 2–4 are structural drawings showing purviews of the solenoid valve depicted in FIG. 1.

Referring to FIG. 1, the solenoid valve includes a core 1, rods 3, 5, and a plunger 2. The plunger 2 is made of magnetic materials, and moves to the left as seen in FIG. 1 by electromagnetic force generated when it is energized. The rod 3 is made of non-magnetic materials. When the plunger 2 moved to the left as seen in FIG. 1, the rod 3 is pressed by the plunger 2 and moves to the left. A spring 4 is placed between the rod 3 and the rod 5 which is made of non-magnetic materials. When the rod 3 moved to the left, the rod 5 is pressed by the rod 3 through the spring 4 and moves to the left. In passing, the plunger 2, the rod 3, the spring 4, and the rod 5 constitute a moving part.

A valve as the moving part 6 is fixed on a tip 5a of the rod 5. When the rod 5 moved to the left, the valve abuts a sealing part 9 of a fluid passage 8, thereby interrupting a flow of fluid. The valve 6 is made of elastic materials such as rubber, which yields when the valve abutted the sealing part 9 of the fluid passage 8.

The fluid passage 8 is formed by a nipple 7, and has a stopper 10 provided in the interior thereof. A rib 7a contributes to give strength to the stopper 10. Additionally, the stopper 10 abuts a center 6b of the valve 6 where a yield is occurred so as to prevent the valve 6 being from excessively yielded.

One of a spring 11 is fixed in the interior of the fluid passage 8, and the other end of which is fixed on a metallic plate 6a as a form-stabilizing part of the valve 6. A pipe 12 is provided around the periphery of the plunger 2, and constitutes a sliding member to suppress a stroke of the plunger 2 by reducing as far as possible a sliding clearance formed between the pipe and the plunger 2. A rubber stopper 13 abuts the rod 5 when the rod 5 returned to the right as seen in FIG. 1. In addition, the moving part has in its terminal a hermetic chamber 14.

The operation of the first embodiment will now be described below.

When the solenoid valve is closed, the solenoid valve is energized, in which case the plunger 2 moves to the left by electromagnetic force generated when the plunger 2 is energized.

Due to this, the rod 3 is pressed by the plunger 2 and moves to the left, while the rod 5 is pressed by the rod 3 via the spring 4 and moves to the left.

As a result, the valve 6 fixed on the tip 5a of the rod 5 moves to the left and abuts the sealing part 9 of the fluid passage 8, thereby interrupting a flow of fluid.

However, since a part of the valve 6 which abuts the sealing part 9 of the fluid passage 8 is made, for instance, of rubber in such a manner as to thin thickness thereof to the utmost, the part yields when it abutted the sealing part 9 of the fluid passage 8, thereby absorbing an impact had when the valve is sealed (at the time of collision). This substantially suppresses production of an actuating sound caused by a collision between the valve 6 and the sealing part 9.

An excessive yield of the valve 6 might cause the valve 6 to enter the interior of the fluid passage 8 of the nipple 7, or the rod 5 to penetrate the valve 6.

For this reason, in the first embodiment, in order to prevent the valve 6 from being excessively yielded, the stopper 10 in pillar shape is provided within the fluid passage 8, and the stopper 10 abuts the center 6b of the valve 6 where a yield is occurred. Mention in passing, the reason why the stopper 10 is formed in pillar shape is to place the stopper 10 within the fluid passage 8 and is not to build air-flow resistance to fluid.

Furthermore, in the first embodiment, the valve 6 includes a plug-in structure to receive an insertion of the tip 5a of the rod 5, and when installing the valve 6 on the tip 5a of the rod 5, the tip 5a of the rod 5 is inserted in the valve 6 (see FIG. 2).

Thereby, a sealing surface of the valve 6 follows up an inclination and a positional deviation of the sealing surface of the sealing part 9 that is a tip of the nipple 7. Consequently, airtightness (fluid-interrupting properties) of the valve 6 is improved.

However, where the valve 6 has a plug-in structure, the rod 5 involves a risk of penetrating the valve 6. On that account, the valve 6 is provided with the metallic plate 6a responsible for form stabilization thereof, and the other end of the spring 11 whose one end is fixed within the fluid passage 8 is fixed on the metallic plate 6a.

Additionally, in the first embodiment, in order to lose weight of the moving part for reducing impact force generated at the time of collision, the rod is divided into the rod 3 and the rod 5, and the spring 4 is placed between the rod 3 and the rod 5 (see FIG. 3).

This reduces impact force generated at the collision by losing weight of the moving part, which reduces loudness of an actuating sound. Moreover, because the spring 4 is provided between the rod 3 and the rod 5, an impact energy generated when the valve 6 abutted the sealing part 9 is absorbed by damper mechanisms of the spring 4, thereby allowing an actuating sound to be reduced still more.

Besides, in the first embodiment, the pipe 12 is provided around the periphery of the plunger 2 to narrow as far as possible a sliding clearance formed between the plunger 2 and the pipe 12, as well as the hermetic chamber 14 is provided in a terminal of the moving part. Therefore, when the plunger 2 moved, air presenting within the hermetic chamber 14 flows out (or flows in) from the clearance composed of the periphery of the plunger 2 and the pipe 12. This exerts an air-dash-pot effect, so that a synergistic effect combined with an increase in a sliding resistance resulted from narrowing a clearance decreases a moving speed of the moving part, reducing loudness of an actuating sound.

As is evident from the above discussions, through the structure according to the first embodiment in which the valve 6 is made of elastic materials developing a tendency to yield when the valve abutted the sealing part 9 of the fluid passage 8, the present invention absorbs an impact had when the valve is sealed (at the time of collision), and reduces loudness of an actuating sound caused by a collision between the valve 6 and the sealing part 9.

Second Embodiment

Figure 5:
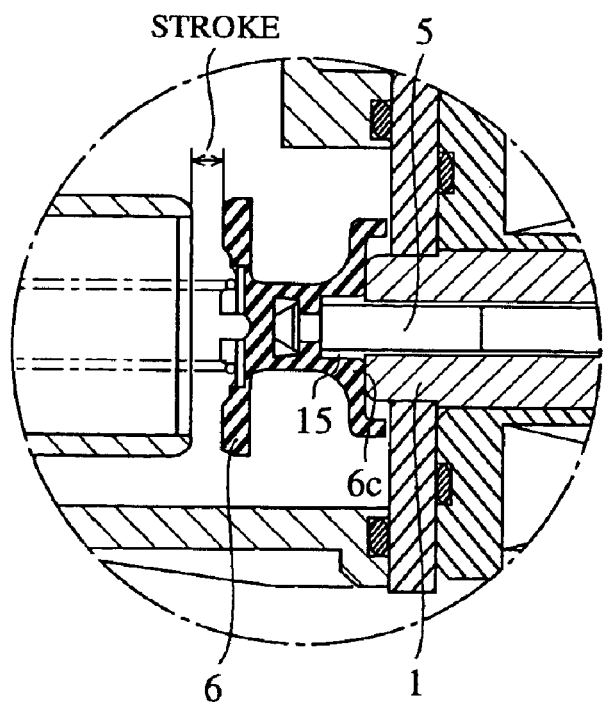
FIG. 5 is a structural drawing showing a purview of a solenoid valve according to a second embodiment of the present invention.

Although no particular reference is made in the first embodiment, the valve 6 may be formed such that the valve covers a gap 15 formed between the rod 5 and the core 1 as shown in FIG. 5.

This prevents intrusion of foreign matters and liquid into a clearance composed of the periphery of the plunger 2 and the pipe 12.

In addition, the valve 6 may be arranged such that a part 6c of the valve 6 abuts the core 1 when the valve 6 is in an open state.

This facilitates regulation of a movable distance (stroke) when electricity is turned on or off, for reason that when electricity is not applied to the solenoid valve, a stroke of the moving part is limited by abutment of the valve 6 with the core 1.

Third Embodiment

Figure 6:
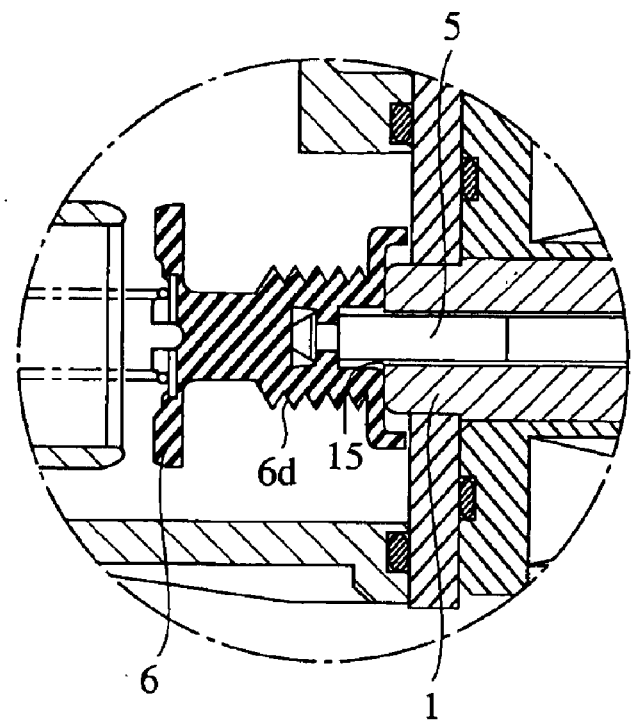
FIG. 6 is a structural drawing showing a purview of a solenoid valve according to a third embodiment of the present invention.

Although no particular reference is made in the second embodiment, the valve 6 may be formed such that a part 6d of the valve 6 expands and contracts when the rod 5 moved, as shown in FIG. 6. That is, the valve 6 may be formed in bellows shape.

This continuously covers a gap 15 formed between the rod 5 and the core 1, even when the valve 6 closed (moved to the left as seen in FIG. 6) by applying electricity to the solenoid, and prevents intrusion of foreign matters and liquid from outside.

Figure 7:
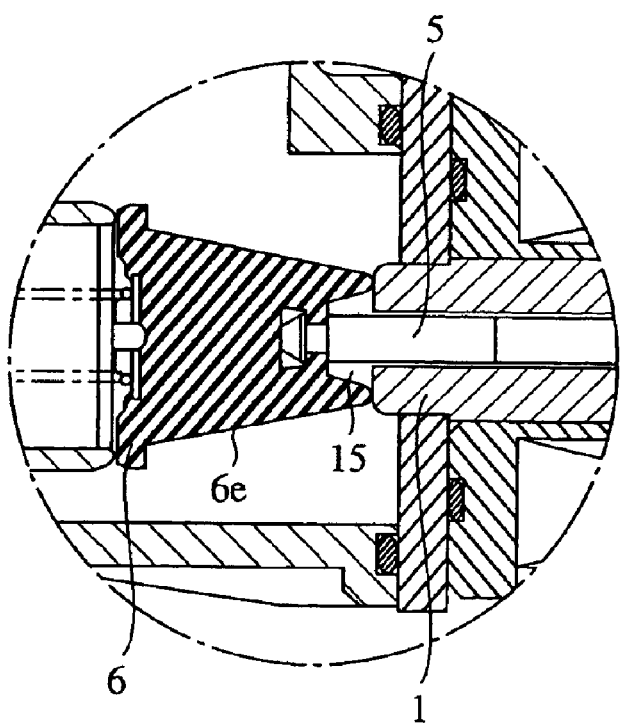
FIG. 7 is a structural drawing showing a purview of a solenoid valve according to a third embodiment.

In addition, the valve 6 may be formed such that a part 6e of the valve 6 deforms as shown in FIG. 7 when the rod 5 moved, thereby exerting the same effect as the aforementioned case.

What is claimed is:

1. A solenoid valve comprising:
   a moving part adapted to be moveable by electromagnetic force; and
   a valve fixed on a tip of the moving part so that a peripheral edge of a top surface of the value abuts a sealing part of a fluid passage when the moving part is moved to a sealing position to interrupt a flow of fluid, wherein:
   the valve comprises an elastic material, so that the valve yields when the valve abuts the sealing part of the fluid passage; and
   the valve is shaped to comprise a wider first outer diameter at the top surface thereof, and a thinner second outer diameter at a portion surrounding the tip of the moving part.

2. The solenoid valve according to claim 1, wherein a stopper is provided within the fluid passage, and the stopper is adapted to abut the valve where a yield occurs to prevent the valve from being excessively yielded.

3. The solenoid valve according to claim 2, wherein the stopper in is pillar-shaped.

4. The solenoid valve according to claim 1, wherein the valve includes a plug-in structure to receive the tip of the moving part, and when installing the valve on the tip of the moving part, the tip of the moving part is inserted in the valve.

5. The solenoid valve according to claim 4, wherein a spring is provided, one end of which is fixed within the fluid passage and the other end of which is fixed in a form-stabilizing part of the valve.

6. The solenoid valve according to claim 1, wherein the moving part comprises two separate moving parts, and a spring is placed between the two moving parts.

7. The solenoid valve according to claim 1, wherein a sliding member that suppresses movement of the moving part is provided, and a hermetic chamber is provided in a terminal of the moving part.

8. The solenoid valve according to claim 1, wherein the valve is arranged to cover a gap formed between the moving part and a core.

9. The solenoid valve according to claim 8, wherein the valve is arranged such that a part of the valve abuts the core when the valve is in an open state.

10. The solenoid valve according to claim 8, wherein when the moving part moves, a part of the valve expands and contracts, or deforms.

11. The solenoid valve according to claim 1, further comprising a hard plate arranged on the top surface of the valve.

12. The solenoid valve according to claim 1, wherein the valve is T-shaped.

13. The solenoid valve according to claim 12, wherein
the solenoid valve further comprises a core supporting the moving part as it moves;
the T-shaped valve further comprises a cup shaped portion on the base of the T-shape opposite to the sealing part of the fluid passage;
when the moving part is moved to the sealing position, the cup shaped portion is separated from the core; and
when the moving part is moved away from the sealing position, the cup shaped portion covers the core.

14. The solenoid valve according to claim 12, wherein
the solenoid valve further comprises a core supporting the moving part as it moves;
the T-shaped valve further comprises a cup shaped portion on the base of the T-shape opposite to the sealing part of the fluid passage, and a bellows portion between the top surface of the valve and the cup shaped portion;
when the moving part is moved to the sealing position, the bellows portion expands to keep the cup shaped portion covering the core; and
when the moving part is moved away from the sealing position, the bellows portion contracts.

15. The solenoid valve according to claim 1, wherein the valve is cone-shaped.

16. The solenoid valve according to claim 15, wherein:
the solenoid valve further comprises a core supporting the moving part as it moves;
the cone-shaped valve further comprises a cup shaped portion on the base of the cone-shape opposite to the sealing part of the fluid passage;
when the moving part is moved to the sealing position, the cup shaped portion contacts the core along a top lip of the cup-shape; and
when the moving part is moved away from the sealing position, the cup shaped portion is deformed around the core.

17. A solenoid valve comprising:
a moving part that moves by electromagnetic force generated when it is energized; and
a valve fixed on a tip of the moving part to abut a sealing part of a fluid passage when the moving part is moved, and to interrupt a flow of fluid, wherein:
the valve is made of elastic materials that shows a tendency to yield when the valve abutted the sealing part of the fluid passage;
the valve includes a plug-in structure to receive an insertion of a tip of the moving part, and when installing the valve on the tip of the moving part, the tip of the moving part is inserted in the valve; and
a spring is provided, one end of which is fixed within the fluid passage and the other end of which is fixed in a form-stabilizing part of the valve.

18. A solenoid valve comprising:
a moving part that moves by electromagnetic force generated when it is energized; and
a valve fixed on a tip of the moving part to abut a sealing part of a fluid passage when the moving part is moved, and to interrupt a flow of fluid, wherein
the valve is made of elastic materials that shows a tendency to yield when the valve abutted the sealing part of the fluid passage; and
a spring is provided, one end of which is fixed within the fluid passage and the other end of which is fixed in a form-stabilizing part of the valve.

19. A solenoid valve comprising:
a moving part that moves by electromagnetic force generated when it is energized; and
a valve fixed on a tip of the moving part to abut a sealing part of a fluid passage when the moving part is moved, and to interrupt a flow of fluid, wherein
the valve is made of elastic materials that shows a tendency to yield when the valve abutted the sealing part of the fluid passage; and
a sliding member that suppresses movement of the moving part is provided, and a hermetic chamber is provided in a terminal of the moving part.

20. A solenoid valve comprising:
a moving part adapted to be moveable by electromagnetic force; and
a valve fixed on a tip of the moving part to abut a sealing part of a fluid passage when the moving part is moved to a sealing position to interrupt a flow of fluid, wherein:
the valve comprises an elastic material that shows a tendency to yield when the valve abuts the sealing part of the fluid passage; and
a stopper is provided within the fluid passage, and the stopper is adapted to abut the valve where a yield occurs to prevent the valve from being excessively yielded.

21. The solenoid valve according to claim 20, wherein the stopper is pillar shaped.

22. A solenoid valve comprising:
a rod-shaped moving part adapted to be moveable by electromagnetic force;
a valve fixed on a tip of the rod-shaped moving part so that a top surface of the valve abuts a sealing part of a fluid passage when the moving part is moved to a sealing position to interrupt a flow of fluid, wherein the valve comprises an elastic material that is adapted to yield when the valve abuts the sealing part of the fluid passage; and
a stopper arranged within the fluid passage along the axis of movement of the rod-shaped moving part so that it abuts the valve when the valve has yielded, but before the yield becomes excessive.

23. A solenoid valve comprising:
a rod-shaped two-piece moving part adapted to be moveable by electromagnetic force;
a valve fixed on a tip of the rod-shaped two-piece moving part so that a top surface of the valve abuts a sealing part of a fluid passage when the rod-shaped two-piece moving part is moved to a sealing position to interrupt a flow of fluid, wherein the valve comprises an elastic material that is adapted to yield when the valve abuts the sealing part of the fluid passage; and a spring arranged between a first portion and a second portion of the rod-shaped two-piece moving part so that the first portion and second portion do not contact each other when the rod-shaped two-piece moving part is moved.

* * * * *